UNITED STATES PATENT OFFICE.

BENJAMIN F. LEE, OF SANDUSKY CITY, OHIO.

IMPROVEMENT IN THE MANUFACTURE OF YEAST-CAKES.

Specification forming part of Letters Patent No. 85,743, dated January 12, 1869.

*To all whom it may concern:*

Be it known that I, BENJAMIN F. LEE, of Sandusky City, in the county of Erie, and in the State of Ohio, have invented a new and Improved Mode of Preserving Solid and Dry Vegetable Yeast-Cakes, (not yeast-powders;) and I do hereby declare that the following is a full and exact description thereof.

The nature of my invention consists in covering the entire surface of the yeast-cakes, when dry, with liquid glue, or any other substance that will protect the yeast-cake from the destructive influences of the atmosphere.

To enable others skilled in the art to make and use my invention, I will proceed to describe it. In order to do this it will be necessary to go through the process of making one of the various vegetable yeast-cakes sold and used.

Thirty (30) gallons of filtered rain-water are brought to a boiling-point, into which are put eight (8) pounds of No. 1 hops. The hops are boiled ten (10) minutes. The whole is then passed through a strainer into a tub containing twenty-five (25) pounds of corn-meal and twelve (12) pounds of rye-flour. The whole is thoroughly stirred and brought to a temperature of 80°. I then add sufficient yeast to cause fermentation, keeping the liquor at the temperature of 70°. The whole is then mixed with corn-meal and brought to a consistency sufficient to roll into cakes. These cakes are spread out, and, when thoroughly dried, are dipped into melted glue, or any other substance that will make an air-tight surface, so as to prevent an escape of the virtues of the yeast-cake.

What I claim as my invention, and desire to secure by Letters Patent, is—

The applying, to the surface of yeast-cakes, melted glue, or any other substance that will prevent a waste of the materials essential to fermentation, and thus render the yeast imperishable.

BENJAMIN F. LEE.

Witnesses:
F. W. PIERCE,
W. W. WETHERELL.